US007051015B1

(12) United States Patent
Street et al.

(10) Patent No.: US 7,051,015 B1
(45) Date of Patent: May 23, 2006

(54) SYSTEM AND METHOD FOR IMPLEMENTING A FLEXIBLE DATA-DRIVEN TARGET OBJECT MODEL

(75) Inventors: Nigel P. Street, Swindon (GB); Christopher J. T. Cherrington, Swindon (GB); Timothy C. Robinson, Cricklade (GB); Andrew I. McDermott, Swindon (GB)

(73) Assignee: Wind River Systems, Inc., Alameda, CA (US)

( * ) Notice: Subject to any disclaimer, the term of this patent is extended or adjusted under 35 U.S.C. 154(b) by 0 days.

(21) Appl. No.: 09/480,844

(22) Filed: Jan. 10, 2000

(51) Int. Cl.
*G06F 17/30* (2006.01)
(52) U.S. Cl. .................... 707/3; 707/10; 707/4
(58) Field of Classification Search .............. 707/2, 707/3, 4, 10, 104.1; 715/501
See application file for complete search history.

(56) References Cited

U.S. PATENT DOCUMENTS

| | | | | |
|---|---|---|---|---|
| 5,761,499 A * | 6/1998 | Sonderegger | ............. | 707/10 |
| 5,852,825 A * | 12/1998 | Winslow | .................. | 707/10 |
| 6,029,175 A * | 2/2000 | Chow et al. | ............ | 707/104.1 |
| 6,029,180 A * | 2/2000 | Murata et al. | ........... | 707/501.1 |
| 6,263,344 B1 * | 7/2001 | Wu et al. | ............... | 707/104.1 |
| 6,356,933 B1 * | 3/2002 | Mitchell et al. | ............ | 707/513 |
| 6,442,558 B1 * | 8/2002 | Brown et al. | ................ | 707/10 |
| 6,539,520 B1 * | 3/2003 | Tiong et al. | ................ | 707/101 |
| 6,643,650 B1 * | 11/2003 | Slaughter et al. | ............ | 707/10 |
| 6,678,738 B1 * | 1/2004 | Haverstock et al. | ........ | 709/246 |
| 6,684,369 B1 * | 1/2004 | Bernardo et al. | ........... | 715/513 |
| 6,885,999 B1 * | 4/2005 | Corless | ........................ | 705/59 |
| 6,931,600 B1 * | 8/2005 | Pittman | ...................... | 715/767 |
| 2002/0038357 A1 * | 3/2002 | Haverstock et al. | ........ | 709/218 |

OTHER PUBLICATIONS

Lau. T. Building a hypermedia information system on the Internet, Professional conference, 1994. IPCC'94 Proceeding. 'Scaling New Height Coimmunication', International, Sep. 28-Oct. 1, 1994, jpage 192-197.*
Usdin et al. XML: not a silver bullet, but a great pipe wrench, StandardView, Sep. 1998, vol. 6, Issue 3, p. 125-132.*

(Continued)

*Primary Examiner*—Jean M. Corrielus
*Assistant Examiner*—Baoquoc N. To
(74) *Attorney, Agent, or Firm*—Fay Kaplun & Marcin, LLP

(57) ABSTRACT

A method and system are disclosed for a flexible data-driven target object model which allows a client to gather and present information about objects on a target system independently of the target's operating system and processor architecture. The object descriptions are implemented using XML in order to provide architecture-generic descriptions of objects. The architecture-generic descriptions define the object data to be returned from the target and also defines its presentation to the user.

12 Claims, 19 Drawing Sheets

OTHER PUBLICATIONS

Chakrabarti Sourmen Hypertext data mining (tutorial AM-1), Conference on Knowledge Discovery in Data, ACM Press, 2000, p. 1-32.*

Onose et al. XQuery at your web services, Internal World Wide Web Conference, ACM Press, 2004, p. 603-611.☐☐.*

Wikes Vanburen Gilbert XML and the new design regime: dispute between desginers, application developers, authors, and readers in changing technological conditions and perceptions of cial and professional need, 2002, p. 33-42.*

W3C XML Working Group, "Extensible Markup Language (XML) 1.0", <http://www.w3.org/TR/REC-xml>, Feb. 10, 1998.

*Padmanabhan V N: "Improving World Wide Web Latency" University of California Report, XX, XX, May 1, 1995, pp. 1-24, XP002041557 p. 3, line 4-line 24.

*Esposito D: "A brand new look for your folders" Internet Document, May 1999, XP002158800 p. 8, line 33-line 36.

*"A System For Allowing Software Development Tools To Remotely Accessan Integrated To Development Environment" Research Disclosure, Kenneth Mason Publication, Hampshire, GB, No. 426, Oct. 1999, pp. 1359-1360, XP000907768 ISSN: 0374-4353 the whole document.

* cited by examiner

Fig. 4a

```xml
<?xml version="1.0" encoding="UTF-8"?>
<!DOCTYPE objType SYSTEM "objTypes.dtd">
<objType objTypeNumber="1" objTypeName="sem" objTypeHandler="tom"
symbolTableName="semClassId">
        <objTypeAttributes>
                <objTypeAttribute key="objTypeVisiblityLevel">
                        <value type="Integer">
                                <literal>1</literal>
                        </value>
                        <formatStr>
                                <literal>%d</literal>
                        </formatStr>
                </objTypeAttribute>
                <objTypeAttribute key="objTypeString1">
                        <valueStr>
                                <literal>Semaphore</literal>
                        </valueStr>
                </objTypeAttribute>
                <objTypeAttribute key="objTypeString2">
                        <valueStr>
                                <literal>Semaphores</literal>
                        </valueStr>
                </objTypeAttribute>
                <objTypeAttribute key="objTypeIconLarge">
                        <valueStr>
                                <literal>semL.ico</literal>
                        </valueStr>
                </objTypeAttribute>
                <objTypeAttribute key="objTypeIconSmall">
                        <valueStr>
                                <literal>sem.gif</literal>
                        </valueStr>
                </objTypeAttribute>
        </objTypeAttributes>
```

Fig. 4b

```xml
<objAttributes>
    <objAttribute key="objId">
        <label>
            <literal>ID</literal>
        </label>
        <value>
            <substitute fieldName="objId"/>
        </value>
        <formatStr>
            <literal>%08x</literal>
        </formatStr>
        <detailLevel>
            <literal>1</literal>
        </detailLevel>
    </objAttribute>
    <objAttribute key="objName">
        <label>
            <literal>Name</literal>
        </label>
        <value>
            <substitute fieldName="objName"/>
        </value>
        <formatStr>
            <literal>%s</literal>
        </formatStr>
        <detailLevel>
            <literal>1</literal>
        </detailLevel>
    </objAttribute>
    <objAttribute key="objOwner">
        <label>
            <literal>Owner</literal>
        </label>
        <value>
            <substitute fieldName="objOwner"/>
        </value>
        <formatStr>
            <literal>0x%08x</literal>
        </formatStr>
        <detailLevel>
            <literal>1</literal>
        </detailLevel>
    </objAttribute>
```

Fig. 4c

```xml
<objAttribute key="objHasChildren">
        <value>
                <switch fieldName="objChildListPtr">
                        <case caseValue="0">
                                <literal>false</literal>
                        </case>
                        <case caseValue="*">
                                <literal>true</literal>
                        </case>
                </switch>
        </value>
        <formatStr>
                <literal>%s</literal>
        </formatStr>
</objAttribute>
<objAttribute key="objType">
        <label>
                <literal>Type</literal>
        </label>
        <value>
                <substitute fieldName="semType"/>
        </value>
        <formatStr>
                <literal>0x%x</literal>
        </formatStr>
        <valueStr>
                <switch fieldName="semType">
                        <case caseValue="0">
                                <literal>Binary</literal>
                        </case>
                        <case caseValue="1">
                                <literal>Mutex</literal>
                        </case>
                        <case caseValue="2">
                                <literal>Counting</literal>
                        </case>
                        <case caseValue="*">
                                <literal>UNKNOWN</literal>
                        </case>
                </switch>
        </valueStr>
        <detailLevel>
                <literal>1</literal>
        </detailLevel>
</objAttribute>
```

Fig. 4d

```xml
<objAttribute key="objState">
    <!--There are two label entries here. The first will be overridden by the second,
    if the second does not return a null value when processed. i.e. if the fieldMap contains an entry for the
    "semType" fieldName, the second label will override the first when processed. In the case of a
    getDatabaseAttributes() call, the second will return a null since "semType" will not be in the field map, and
    the value contained in the first will persist.-->
    <label>
        <literal>State/Count/Owner</literal>
    </label>
    <label>
        <switch fieldName="semType">
            <case caseValue="0">
                <!--Binary Semaphore-->
                <literal>State</literal>
            </case>
            <case caseValue="1">
                <!--Mutex Semaphore-->
                <literal>Owner</literal>
            </case>
            <case caseValue="2">
                <!--Counting Semaphore-->
                <literal>Count</literal>
            </case>
            <case caseValue="*">
                <literal>Owner</literal>
            </case>
        </switch>
    </label>
    <value>
        <substitute fieldName="semState"/>
    </value>
    <formatStr>
        <switch fieldName="semType">
            <case caseValue="2">
                <!--Counting Semaphore - display as decimal-->
                <literal>%d</literal>
            </case>
            <case caseValue="*">
                <!--Any other sort of semaphore - display as hex-->
                <literal>0x%x</literal>
            </case>
        </switch>
    </formatStr>
```

Fig. 4e

```xml
<valueStr>
        <!--Override the valueStr, even though the value and formatStr has
been specified. This allows decoding of the Semaphore statie into plain text. The only option is for a
Counting, or unknown Semaphore, where no CaseValue is specified. This allows the XML code to fall
through the Switch statement without finding a match. In this case, no value will be inserted into the
valueStr from here, leaving the XML code to compose one from the contents of the value combined with
the formatStr.-->
        <switch fieldName="semType">
                <case caseValue="0">
                        <!--Binary Semaphore-->
                        <switch fieldName="semState">
                                <case caseValue="0">
                                        <literal>FULL</literal>
                                </case>
                                <case caseValue="*">
                                        <literal>EMPTY</literal>
                                </case>
                        </switch>
                </case>
                <case caseValue="1">
                        <!--Mutex Semaphore-->
                        <switch fieldName="semState">
                                <case caseValue="0">
                                        <literal>Unowned</literal>
                                </case>
                        </switch>
                </case>
                <!--For caseValue = 2 (Counting semaphore) or for any
other value, let this fall through without filling in a value. In this case, a valueStr will be composed
automatically from the value and formatStr entries-->
        </switch>
</valueStr>
<detailLevel>
        <literal>1</literal>
</detailLevel>
</objAttribute>
<objAttribute key="objOptions">
        <label>
                <literal>Options</literal>
        </label>
        <value>
                <substitute fieldName="semOptions"/>
        </value>
        <formatStr>
                <literal>0x%08x</literal>
        </formatStr>
```

Fig. 4f

```xml
<valueStr>
    <typedef>
        <switch fieldName="semOptions" fieldMask="0x0003">
            <case caseValue="0">
                <literal>SEM_Q_FIFO</literal>
            </case>
            <case caseValue="1">
                <literal>SEM_Q_PRIORITY</literal>
            </case>
            <case caseValue="*">
                <literal>SEM_Q_UNKNOWN</literal>
            </case>
        </switch>
        <bitfield fieldName="semOptions"
                  fieldMask="0xFFFFFFFC">
            <bit mask="0x0004">
                <literal>SEM_DELETE_SAFE</literal>
            </bit>
            <bit mask="0x0008">
                <literal>SEM_INVERSION_SAFE</literal>
            </bit>
            <bit mask="*">
                <literal>SEM_UNKNOWN</literal>
            </bit>
        </bitfield>
    </typedef>
</valueStr>
<detailLevel>
    <literal>1</literal>
</detailLevel>
</objAttribute>
<objAttribute key="objIconSmall">
    <valueStr>
        <switch fieldName="semState">
            <case caseValue="0">
                <literal>sem.gif</literal>
            </case>
            <case caseValue="*">
                <literal>semempty.gif</literal>
            </case>
        </switch>
    </valueStr>
</objAttribute>
</objAttributes>
```

Fig. 4g

```xml
<objGopher>
    <switch fieldName="cpu">
        <case caseValue="*">
            <program>
                <!--Default Get object info for sem - taken from PPC860-->
                <![CDATA[! <+0x30*<+0x30@>> <+0x28*$><+0x20*!><+0x8@> %nameLookup%<+0x34@b><+0x35@b><+0x48@>]]>
            </program>
            <tape>
                <field fieldName="objId"/>
                <field fieldName="objTypeNumber"/>
                <field fieldName="objName"/>
                <field fieldName="objOwner"/>
                <field fieldName="objChildListPtr"/>
                <field fieldName="semType"/>
                <field fieldName="semOptions"/>
                <field fieldName="semState"/>
            </tape>
        </case>
    </switch>
</objGopher>
<enumByType>
    <switch fieldName="cpu">
        <case caseValue="*">
            <program>
                <![CDATA[*+0x38** -0x18! <+0x30*<+0x30@>> <+0x28*$><+0x20*!><+0x8@> <+0x34@b><+0x35@b><+0x48@>+0x18@]]>
            </program>
            <tape>
                <field fieldName="objId"/>
                <field fieldName="objTypeNumber"/>
                <field fieldName="objName"/>
                <field fieldName="objOwner"/>
                <field fieldName="objChildListPtr"/>
                <field fieldName="semType"/>
                <field fieldName="semOptions"/>
                <field fieldName="semState"/>
                <field fieldName="objSiblingPtr"/>
            </tape>
```

Fig. 4h

```
                            <program>
                                    <![CDATA[%objSiblingPtr% -0x18! <+0x30*<+0x30@>>
<+0x28*$><+0x20*!><+0x8@><+0x34@b><+0x35@b><+0x48@>+0x18@]]>
                            </program>
                            <tape>
                                    <field fieldName="objId"/>
                                    <field fieldName="objTypeNumber"/>
                                    <field fieldName="objName"/>
                                    <field fieldName="objOwner"/>
                                    <field fieldName="objChildListPtr"/>
                                    <field fieldName="semType"/>
                                    <field fieldName="semOptions"/>
                                    <field fieldName="semState"/>
                                    <field fieldName="objSiblingPtr"/>
                            </tape>
                    </case>
            </switch>
        </enumByType>
</objType>
```

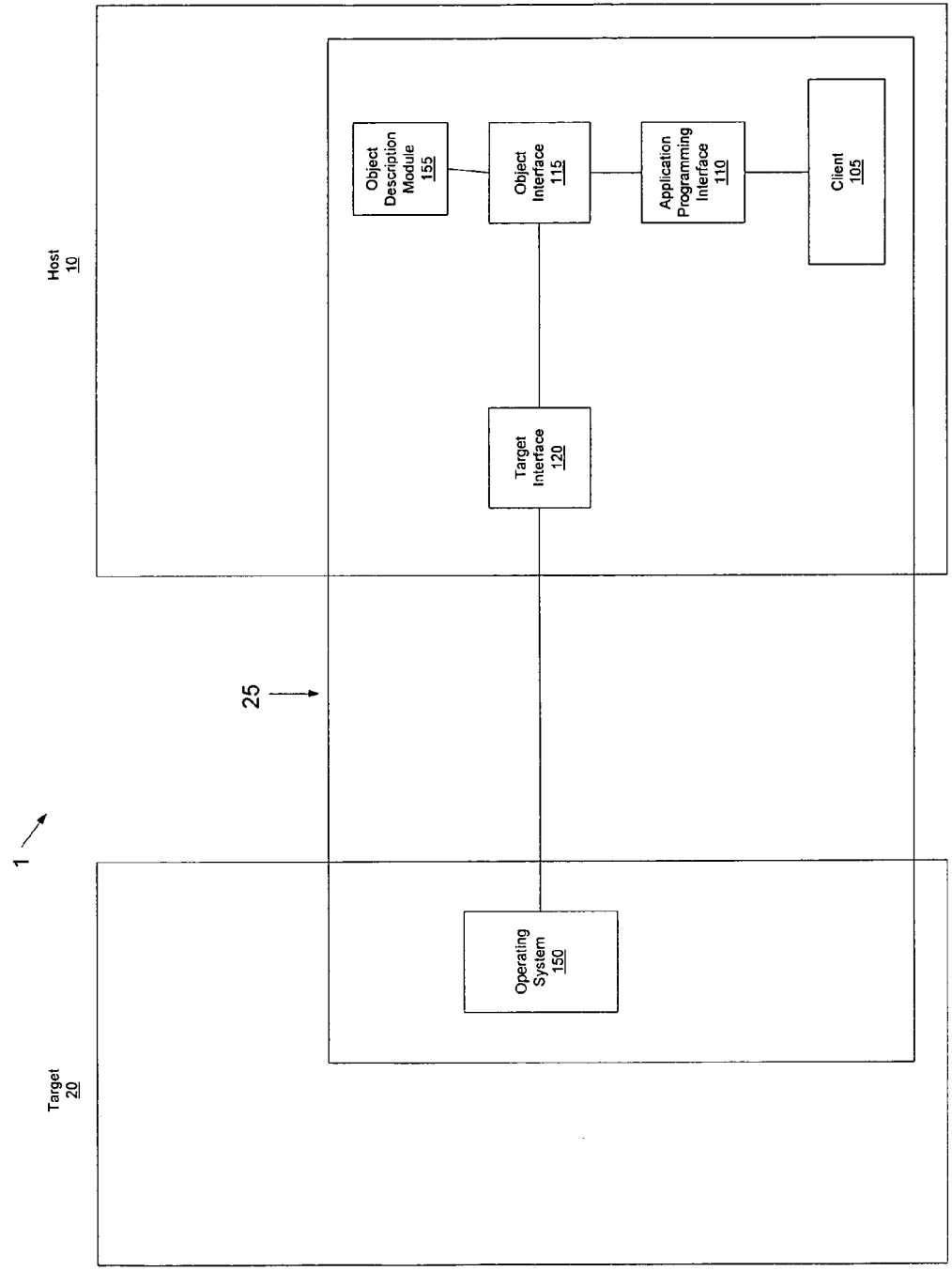

Fig. 9a

```xml
<?xml version="1.0" encoding"utf-8"?>

<object name="binarySemaphore"
icon="k:\wpwr\host\resource\bitmaps\WindView\events\semBCreate.bmp">

<helpText>

<synopsis>
            This is a short description of the object.
        </synopsis>

<description>
            This is a much longer description of the object.
            This description can contain anything the user desires.
        <description>

</helpText>

<publicDataGet>

<helpText>
            <synopsis>Get all public data members</ synopsis>
            <description> A full description of the routine</description>
        </help Text>

<requestBegin>
            <call name="semRequestBegin"/>
            <return type="UINT8*"/>
            <parm type="SEM_ID"name="semId"/>
        </requestBegin>

<requestEnd>

<callname="semRequestEnd"/>
            <return type= "STATUS"/>
            <parm type="UINT8 *" name="pBuff"/>
        </requestEnd>
```

Fig. 9b

```
<data>
    <dataItem type="UINT"idref="pkLength"display="never"/>
    <dataItemtype="UINT"idref="semId"
        text="Handle"format="0x08x"display="always"
        position="1"/>
    <dataItem type="UINT"idref="semClassId"display="never"/>
    <dataItem type="string" idref="name"
        text="Name" format="%s" display="always"
        position="0"/>
    <dataItem type="string" idref="owner"
        text="Owner" format="%s" display="always"
        position="2"/>
    <dataItem type="int"diref="value"
        text="State"format="translate"display="always"
        position="3"
        <translate key ="0" value="Empty" format="%s"/>
        <translate key="1" value="Taken" format="%s"/>
        <translate key="*"value="Unknown" format="%s"/>
    </dataItem>
</data>

</pubicDataGet>

</object>
```

SYSTEM AND METHOD FOR IMPLEMENTING A FLEXIBLE DATA-DRIVEN TARGET OBJECT MODEL

BACKGROUND INFORMATION

An integrated development environment ("IDE") is typically used to develop software in a "target" computer system. The IDE includes one or more "host" installations which may be connected to the target system in order to load the developed software into the target system and monitor its execution. A number of alternatives exist for connecting the target system to the host, but usually the connection is either an Ethernet or serial link.

In a development system, the host is typically equipped with large amounts of RAM and disk space, backup media, printers, and other peripherals. In contrast, the target system typically has limited resources (small amounts of RAM, no disk, no display, etc.), and perhaps some small amount of additional resources for testing and debugging. The target may include no more than a processor with on-chip RAM and a serial input/output channel. The target's processor may be of various kinds including the PowerPC® processor manufactured by IBM Corp. or the Pentium® II manufactured by Intel Corp. The target may also include an operating system, such as VxWorks® from Wind River Systems, Inc., which may be used to control the allocation and usage of the target's resources.

The IDE may include a number of "tools" that allow a software developer to easily develop software for the target system and monitor the generation of the developed software on the target system. One such tool may be an "object browser" which can be conveniently used to monitor the state of the target system while developed applications are executing. The object browser can be used to display information about "objects" in the system, for example, information about objects of the operating system executing on the target. These objects may include tasks, semaphores, message-queues, memory-partitions, watchdogs, etc. Each object also has attributes which are the properties of the object. For example, a semaphore (an object) may have as attributes its name, identification number, and state (e.g., whether the semaphore is taken). The attributes of an object may be static (i.e., determining the object attribute does not require access to the target system) or dynamic (i.e., determining the object attribute does require access to the target system). The static attributes of the object may include, among others, a string describing the type of object (e.g., for the semaphore, the string may be "Semaphore"). The dynamic attributes may include, among others, the name of the object, the object's identification number, and the state of the object.

In a host-target development environment, in order for the host to gather information about the objects running on the target, the host generally has one or more files describing the target system's implementation of the object and this description file is specific to the implementation of the object by the operating system running on the target system. For example, the description files can list offsets to internal fields within each object's data structure, allowing the tools on the host to locate information concerning the object running on the target system. Information concerning the object is then retrieved from the target system using a standard communication protocol such as a Gopher program. The Gopher program describes a sequence of memory reads which results in a sequence of data to be returned to the calling host.

This scheme just described for gathering information is unwieldy in practice and not easily scalable. It is expensive to extend and maintain because introducing a new object requires updating many architecture specific files.

SUMMARY OF THE INVENTION

A method and system for retrieving and presenting data from a target system, the method includes retrieving object data from the target system for an object selected by a client, the retrieval performed by using one of the data retrieval programs corresponding to the target system. The method also includes providing the object data and a presentation format to the client, the object data and the presentation format are based upon one of the object description files corresponding to the object selected by the client.

BRIEF DESCRIPTION OF THE DRAWINGS

FIGS. 4a–h show sample eXtensible Markup Language ("XML") code for implementing a semaphore object according to the second exemplary embodiment of the present invention.

FIG. 7 shows a block diagram of the development environment according to a fourth embodiment of the present invention.

FIGS. 9a–b show sample XML code for implementing a semaphore object according to the fourth embodiment of the present invention.

DETAILED DESCRIPTION

Figure 1:
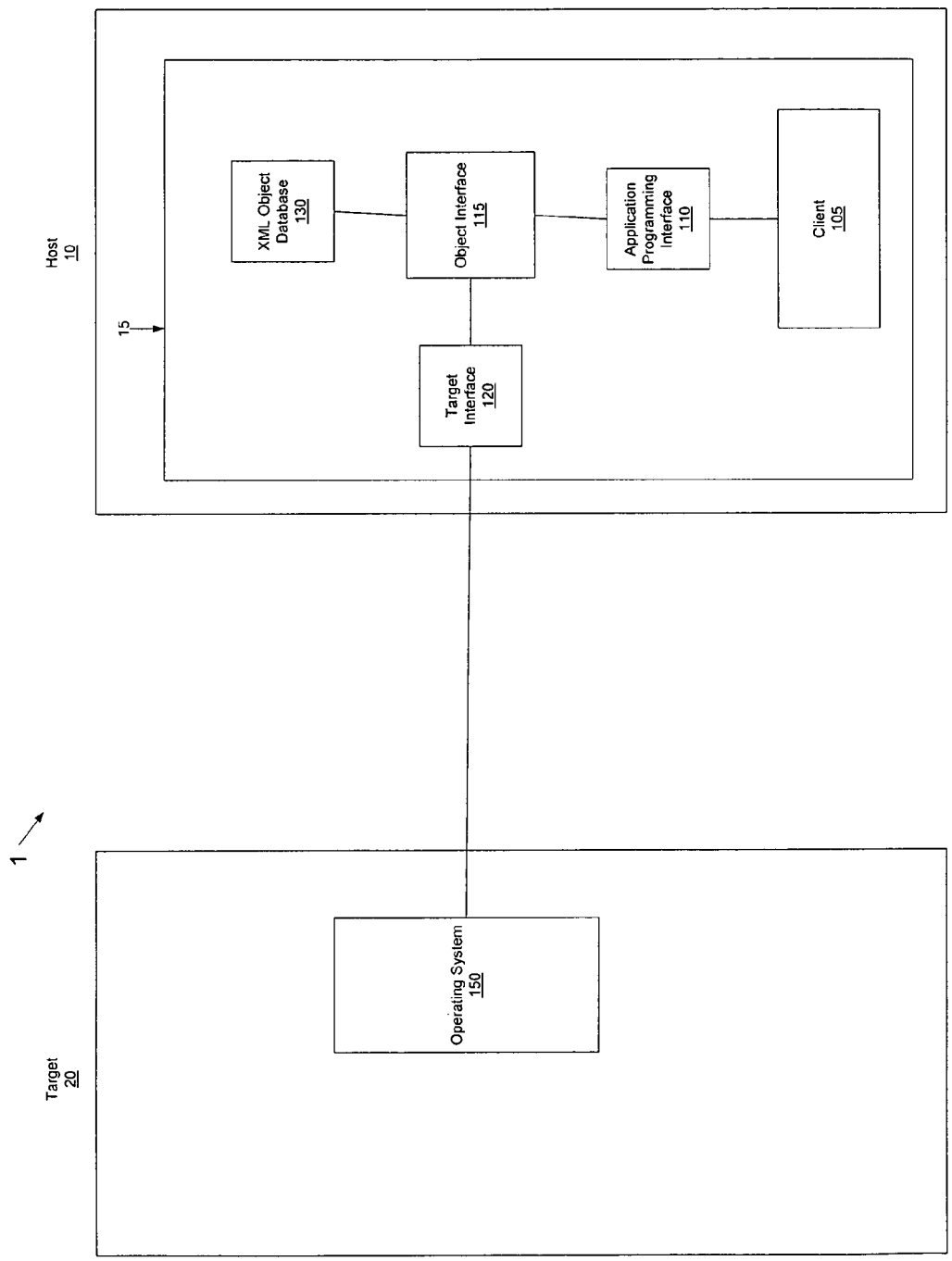
FIG. 1 shows a block diagram illustrating a development environment according to a first exemplary embodiment of the present invention.

According to the present invention, a flexible object model may be implemented, for example, in the IDE employing host and target systems. The flexible object model allows information about objects running on the target to be gathered independently of a target's architecture (i.e., the operating system running on the target and the processor architecture of the target). The flexible object model has the following benefits:

(1) It supports an object framework usable by more than one development tool (i.e., can be used by any number of applications such as the browser, debugger, shell, etc.);

(2) It presents an interface to a client (e.g., the object browser) that is independent of the target's operating system and processor architecture;

(3) It allows browsing of public attributes of objects while hiding object implementation details;

(4) It is self-descriptive regarding those objects that are supported for each given operating system, and this is user extensible by augmenting the existing (XML) database with descriptions of new objects;

(5) It provides information regarding how object data may be most naturally presented and manipulated by the client; and (6) It provides information about what actions on objects are permissible.

In one exemplary embodiment of the present invention, eXtensible Markup Language ("XML") is used to describe the publicly accessible information of an object as well as the method by which that information can be accessed from the object and used in the IDE. XML is referred to as a "metalanguage", or a language for describing other languages. An XML file is made up of XML elements, each of which consists of a start tag (e.g., <title>), an end tag (e.g., </title>), and the information between the two tags (referred to as the content). Like Hypertext Markup Language ("HTML"), an XML document holds text annotated by tags. However, unlike HTML, XML allows an unlimited set of tags, each indicating not how something should look, but what something means. Rather than describing the order and fashion in which the data should be displayed, the tags in XML indicate what each item of data means. Detailed information on the XML standard is provided in: "Extensible Markup Language (XML) 1.0", W3C Recommendation 10-Feb.-1998, REC-xml-19980210, http://www.w3.org/TR/REC-xml.

XML allows the host to carry architecture-generic descriptions of objects, each object having an XML file. This architecture-generic description would define the object data to be returned from the target and also define its presentation to the client. XML is thus suited for implementing the exemplary embodiment because it allows for architecture-generic descriptions of how to access and use data pertaining to objects.

The use of XML as the object description language would have the following benefits:

(1) provides a machine readable object description;

(2) it is an open standard which will allow the use of third party tools to browse, format, and manipulate the data contained in the XML database;

(3) potential for users to use a tool to define their own objects; and (4) compilers to produce source-code, documentation, and browsing support.

Referring to the figures in which like numerals indicate like elements, FIG. 1 is a block diagram illustrating an exemplary development environment 1 according to a first exemplary embodiment of the present invention. As shown, a host 10 is connected to a target 20 via, for example, a serial or Ethernet link.

The host 10 may comprise a computing environment having various well-known components and systems (for example, a processor, a memory system, a display, and user input devices such as a keyboard and mouse). The host 10 may include an operating system (e.g., Unix, Windows, Linux, etc.) which controls the execution of applications on the host 10.

The target 20 may comprise a second computing environment which, for example, is intended to operate apart from the host 10. The processor of the target 20, for example, may be an Intel Pentium® II processor or an IBM PowerPC® processor. The target 20 may include fewer resources than the host 10, thus making it advantageous to perform software development on the host 10 prior to implementation in the target 20. The target 20 may include an operating system 150 which controls the execution of applications and other objects running on the target 20. The operating system 150, along with user applications running on the target 20, uses various kernel objects ("objects") such as semaphores and tasks.

The host 10 includes a development system 15 to be used in developing software for the target 20. Included in the development system 15 is at least one client 105, which may be one of a number of known development tools (e.g., the object browser, debugger, etc.). During operation, the client 105 may require information about objects running on the target 20. In order to monitor the operations of objects on the target 20, an application programming interface ("API") 110 is provided giving the client 105 access to an object interface ("OI") 115 and which allows the client 105 to access information (e.g., attributes) about the objects running on the target 20. The API 110 thus allows development tools such as the object browser, debugger, command line shell, etc. to communicate with the OI 115.

The OI 115 is a program that allows the client 105 to obtain information about objects running on the target 20 independently of the target's architecture (which is described below) or its operating system. The OI 115 also includes an XML interpreter which is used to read XML files and provide access to their content and structure.

The development system 15 also includes a target interface ("TI") 120 which is used by the OI 115 to access information about the objects running on the target 20. The TI 120 includes the Gopher standard protocol which is used to gather information about an object running on the target 20.

The development system 15 further includes an object database containing descriptions of objects for each known operating system and also data retrieval programs for various target processor architectures. In the first exemplary embodiment, the object database is an XML object database 130 and the object descriptions for each known operating system are implemented using XML. Also, in the first exemplary embodiment, Gopher programs, corresponding to recognized target processor architectures, are the data retrieval programs. However, in other embodiments, the object descriptions may be implemented using other languages and other programs may be used to retrieve data from the target 20. The XML object database 130 may be accessed by the OI 115 in order to process requests by the client 105 for information about an object running on the target 20.

Figure 2A:
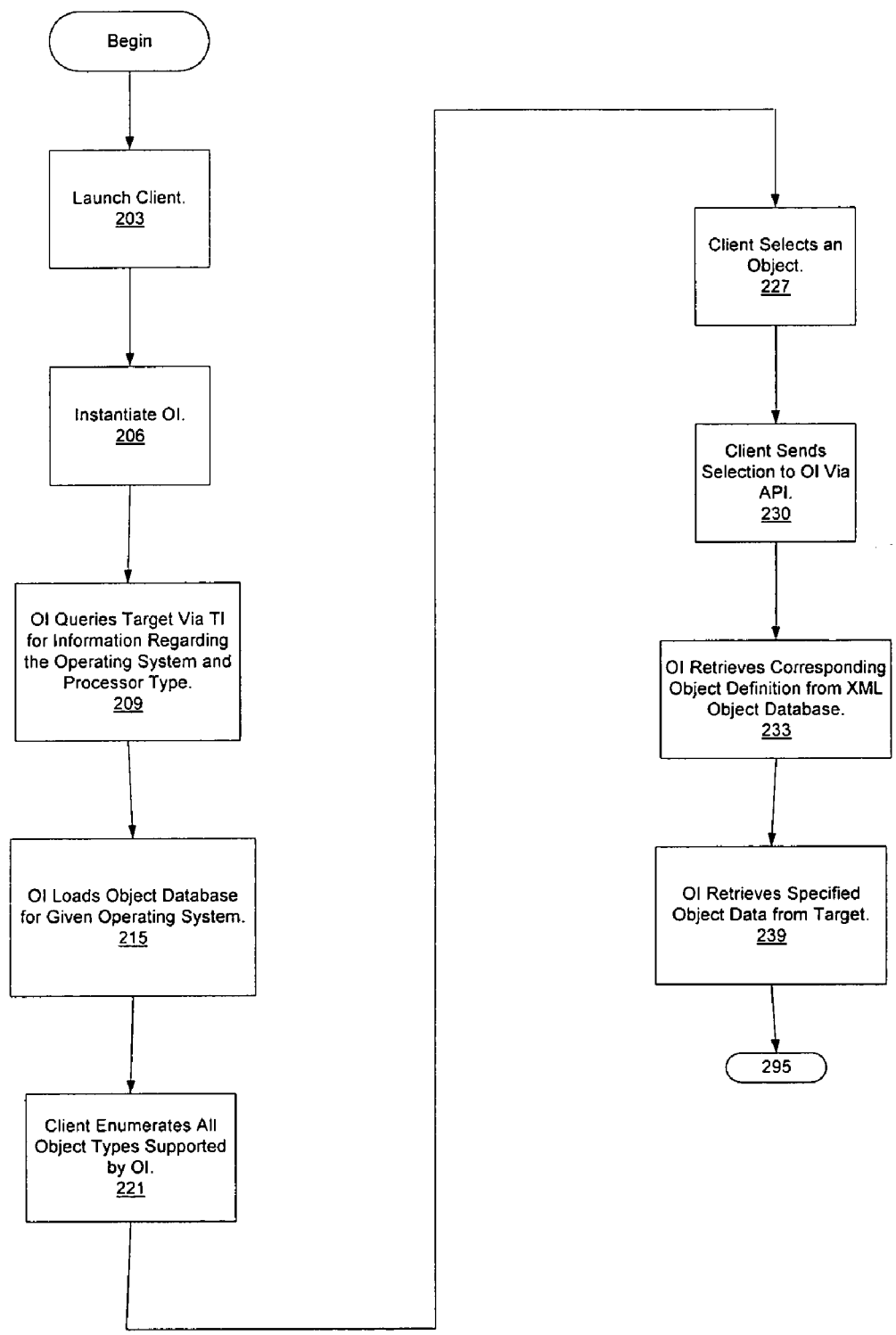
FIGS. 2a–b show a flowchart illustrating the steps involved in gathering object information according to the first exemplary embodiment of the present invention.
Figure 2B:
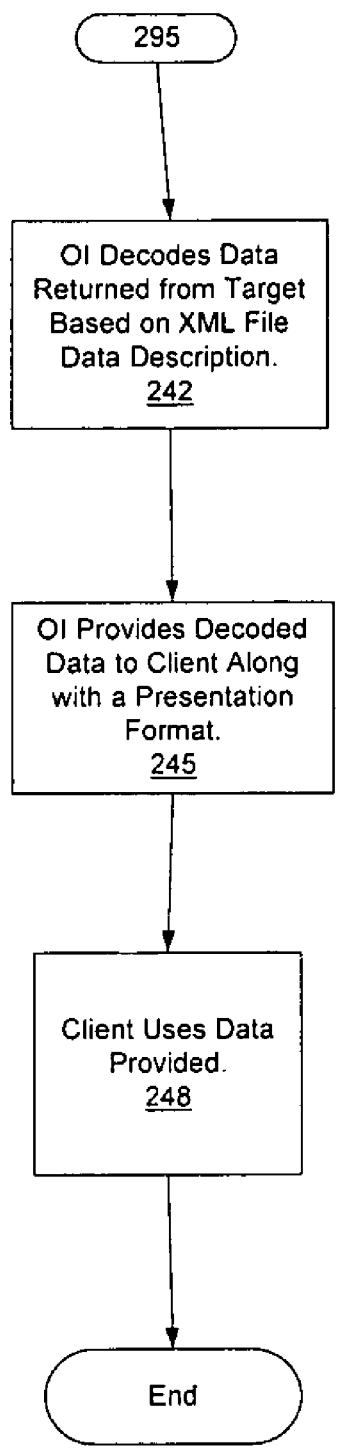

FIGS. 2a–b (hereinafter, collectively referred to as "FIG. 2") show a flowchart illustrating the steps involved in gathering information about the objects running on the target 20 using the first exemplary embodiment of the present invention. In step 203, the client 105 is launched by, for example, a user. In step 206, the client 105 instantiates the OI 115 in order to get object information from the target 20. The OI 115 needs to be initialized. In step 209, the OI 115 queries the target 20 via the TI 120 for information regarding the processor type and the operating system 150 of the target 20 and retrieves this information from the target 20. In step 215, the OI 115 loads the XML object description files for the specified target operating system from the XML object database 130. After the XML object description files are loaded and successfully validated against a Document Type Definition ("DTD") file, the OI 115 is now initialized.

In step 221, the client 105 "enumerates" all the objects supported by the OI 115. Enumerating the objects means to determine all the static attributes of the known objects, i.e., those attributes which do not require access to the target 20. The client 105 is provided enumeration information (i.e., information about the static attributes of the object) by the OI 115. The OI 115 obtains the enumeration information solely by using the XML object descriptions in the XML object database 130: there is one XML object description per object supported. No reference is made to the target 20 via the TI 120 for enumeration of the supported objects. The attributes of each object are defined in the XML object database 130 and may include, among others, the name of the object, the standard icon, the state, label, whether the object is displayable, how data displayed, etc.

In step 227, the client 105 requests further details about an object selected by the user. In step 230, the client 105 sends a reference to the object selected to the OI 115 via the API 110. In step 233, the OI 115 accesses the XML object database 130 to retrieve the XML object description corresponding to the selected object. The OI 115 also retrieves from the XML object database 130 the Gopher program corresponding to the processor of the target 20. A Gopher program may exist for each of the many possible target processor architectures if such a program is required—an advantage of this embodiment of the present invention is that a Gopher program can be shared by different target processor architectures if they use the same memory layout for software objects.

In step 239, the OI 115 accesses the target 20 using a data retrieval method to collect data from the target 20. In one embodiment, the data retrieval method is passing the Gopher program from the OI 115 through the TI 120 to the target 20 in order for the OI 115 to gather data about the selected object. The returned data is referred to as a "Gopher tape." In step 242, the OI 115 decodes the data returned from the target 20 based on the XML object description retrieved from the XML object database 130. In step 245, the OI 115 sends the decoded data to the client 105 along with a presentation format. The presentation format is also based on the XML object description and instructs the client 105 on how to display the decoded data. The decoded data and the presentation format allow the client 105 to be data driven. The decoded data for the selected object is returned to the client 105 as a set of object attributes. In step 248, the client 105 uses the set of object attributes which was returned as a result of the original request. Such use of the object attributes can be, for example, in the case of the object browser, to display the object's attributes in a format suitable for a graphical user interface ("GUI").

The previous embodiment shows how the OI 115 can be used to retrieve information about objects running on the target. In a second exemplary embodiment according to the present invention, the OI 115 can be used by a specific development tool—an object browser—to display information about objects running on a specific target. In this example, the processor of the target 20 is the PowerPC® processor, and the operating system 150 of the target 20 is VxWorks®. In other alternative embodiments, the OI 115 may be used by other development tools such as a debugger (e.g., the debugger would need to enumerate tasks in order to attach to one of them), and a command line shell (e.g., the shell may provide system information such as a snapshot of the tasks running on the target).

The following example illustrates the use of the exemplary OI 115 and the XML object database 130 by the object browser to obtain information (i.e., attributes) about objects running on the target. Referring again to FIG. 2 but now for the case where the client 105 is specifically the object browser, in step 203, the object browser is launched by, for example, the user. In step 206, the object browser instantiates the OI 115 in order to get object information from the target 20. In step 209, the OI 115 queries the target 20 via the TI 120 for information regarding the processor type and the operating system 150 of the target 20 and retrieves this information from the target 20.

In step 215, the OI 115 loads the XML object descriptions for VxWorks® from the XML object database 130. In step 221, the object browser enumerates all object types supported by the OI 115 using the XML object descriptions obtained from the XML object database 130. In step 227, the object browser requests further details on a particular object selected by the user of the object browser. In step 230, the object browser sends the object selected to the OI 115 via the API 110.

In step 233, the OI 115, based on the object selected, retrieves the corresponding XML object description from the XML object database 130. The OI 115 also retrieves from the XML object database 130 the Gopher program corresponding to the PowerPC® processor in order to retrieve the attributes of the selected object running on the target 20. In step 239, the OI 115 accesses the target 20 to retrieve the attributes of the selected object running on the target 20 using the Gopher program by sending the Gopher program through the TI 120 to the target 20.

In step 242, the OI 115 decodes the data returned from the target 20 based on the XML object description retrieved from the XML object database 130. In step 245, the OI 115 sends the decoded data (i.e., object attributes) to the object browser along with the presentation format. In step 248, the object browser displays the object attributes in the format as specified by the presentation format.

Figure 3:
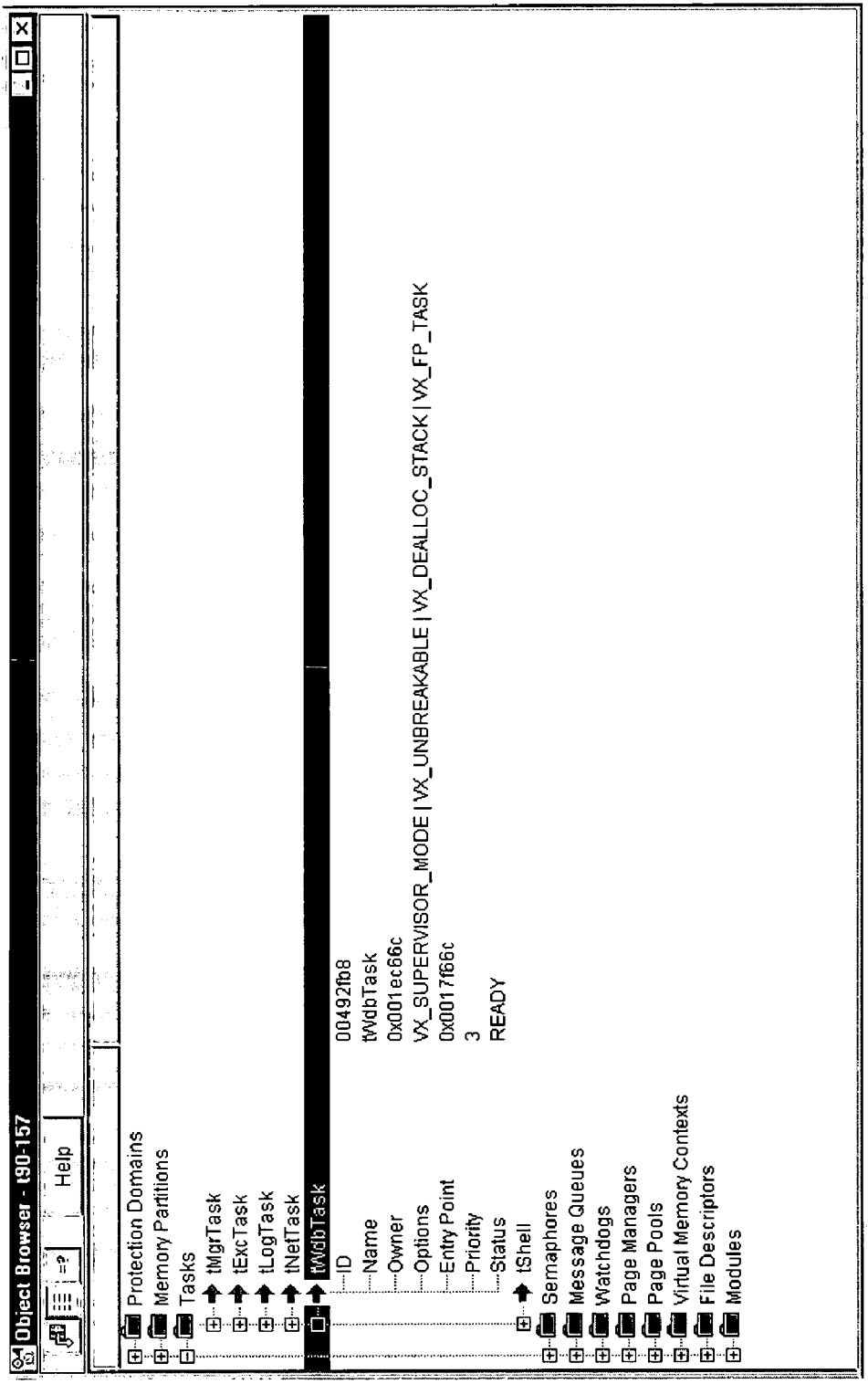
FIG. 3 shows a user interface according to a second exemplary embodiment of the present invention.

FIG. 3 shows a user interface of the object browser according to the second exemplary embodiment of the present invention. In FIG. 3, all of the objects types supported are shown. The object types supported here are: (1) protection domains, (2) memory partitions, (3) tasks, (4) semaphores, (5) message queues, (6) watchdogs, (7) page managers, (8) page pools, (9) virtual memory contexts, (10) file descriptors, and (11) modules. In FIG. 3, a task browser is selected, allowing the user to see detailed information about a particular task. The task list shown (tMgrTask, tExcTask, etc.) in FIG. 3 is retrieved from the target 20. The user can expose further levels of detail by clicking the "plus sign" icon. In FIG. 3, specific object attributes of tWdbTask are shown such as its ID, Name, Owner, Status, etc.

FIGS. 4a–h (hereinafter, collectively referred to as "FIG. 4") show sample XML code for implementing a semaphore object according to the second exemplary embodiment. The first line of FIG. 4 is an XML declaration which specifies the version of XML being used (here, version "1.0" is used). The first line also contains an encoding declaration (here, characters are encoded using UTF-8). The second line references the external DTD file. This file essentially defines the rules of the document, such as which elements are present and the structural relationships between the elements. In line two, the "objTypes.dtd" is defined as the DTD. With XML, DTDs are optional.

The third and fourth lines of FIG. 4 define the specifics of the object type. For example, the object is defined as a semaphore (objTypeName="sem") and given a unique object number (objTypeNumber="1").

The "objTypeAttributes" in FIG. 4 contain descriptions of those attributes which are static, i.e., those attributes which do not require target access. The "objAttributes" contain descriptions of those attributes which do require target access. The "objGopher" contains the Gopher programs used by the OI 115 for each target architecture along with a logical identifier to be attached to the returned value. This identifier is referenced in the "objAttribute" to decode the returned data.

Figure 5:
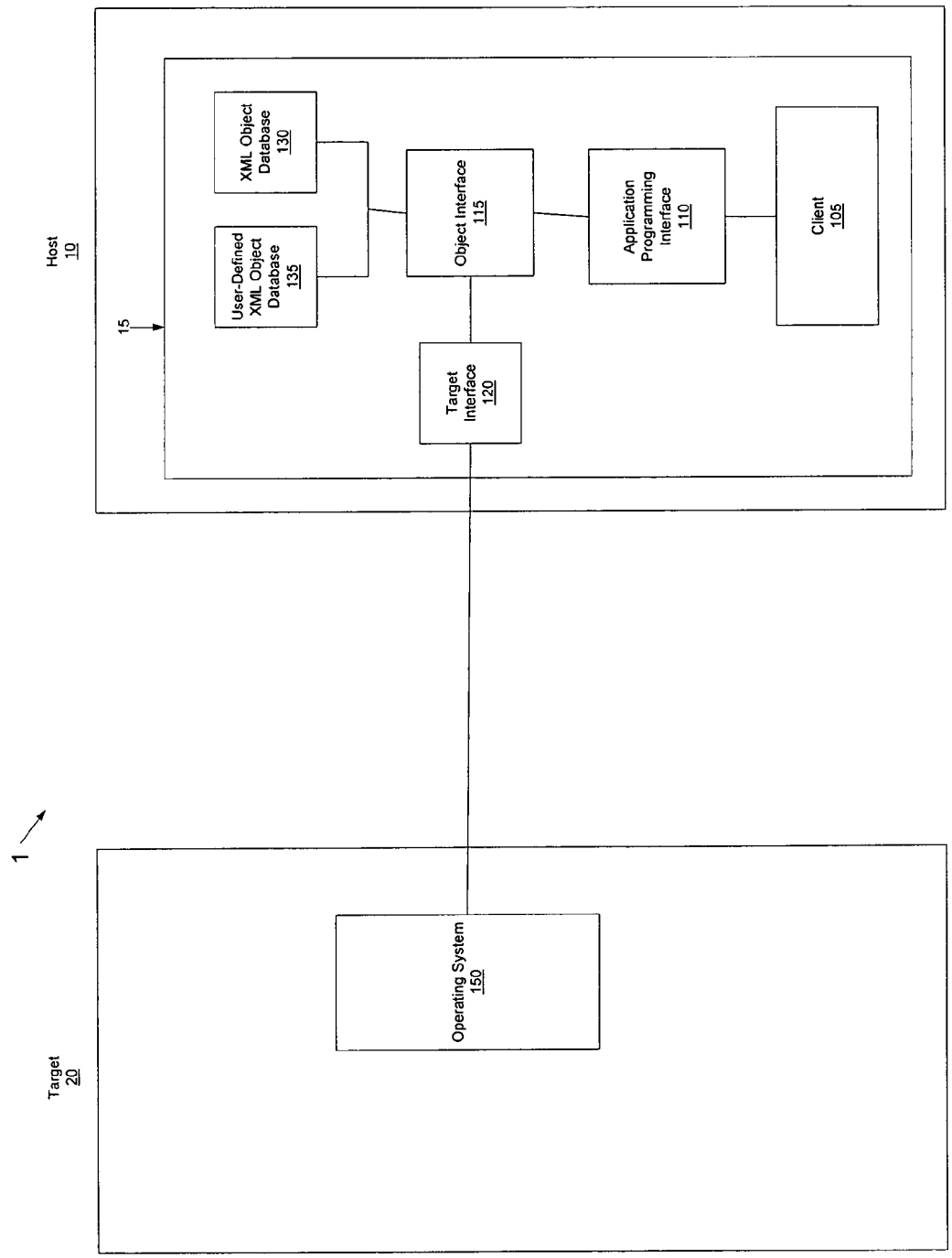
FIG. 5 shows a block diagram illustrating the development environment according to a third exemplary embodiment of the present invention.

FIG. 5 is a block diagram illustrating a third exemplary embodiment according to the present invention where a user-defined XML object database 135 is added to the development system 15. The user-defined XML object database 135 may contain user-defined object descriptions. In one embodiment, the user-defined object descriptions are in XML in order for the object descriptions to be architecture-generic. The user-defined XML object database 135 provides for the extension of known objects by adding to the database a user-defined XML object description which describes the new object. The user-defined XML object database 135 allows the user to add custom objects and thus expand the number of objects supported by the OI 115.

Figure 6A:
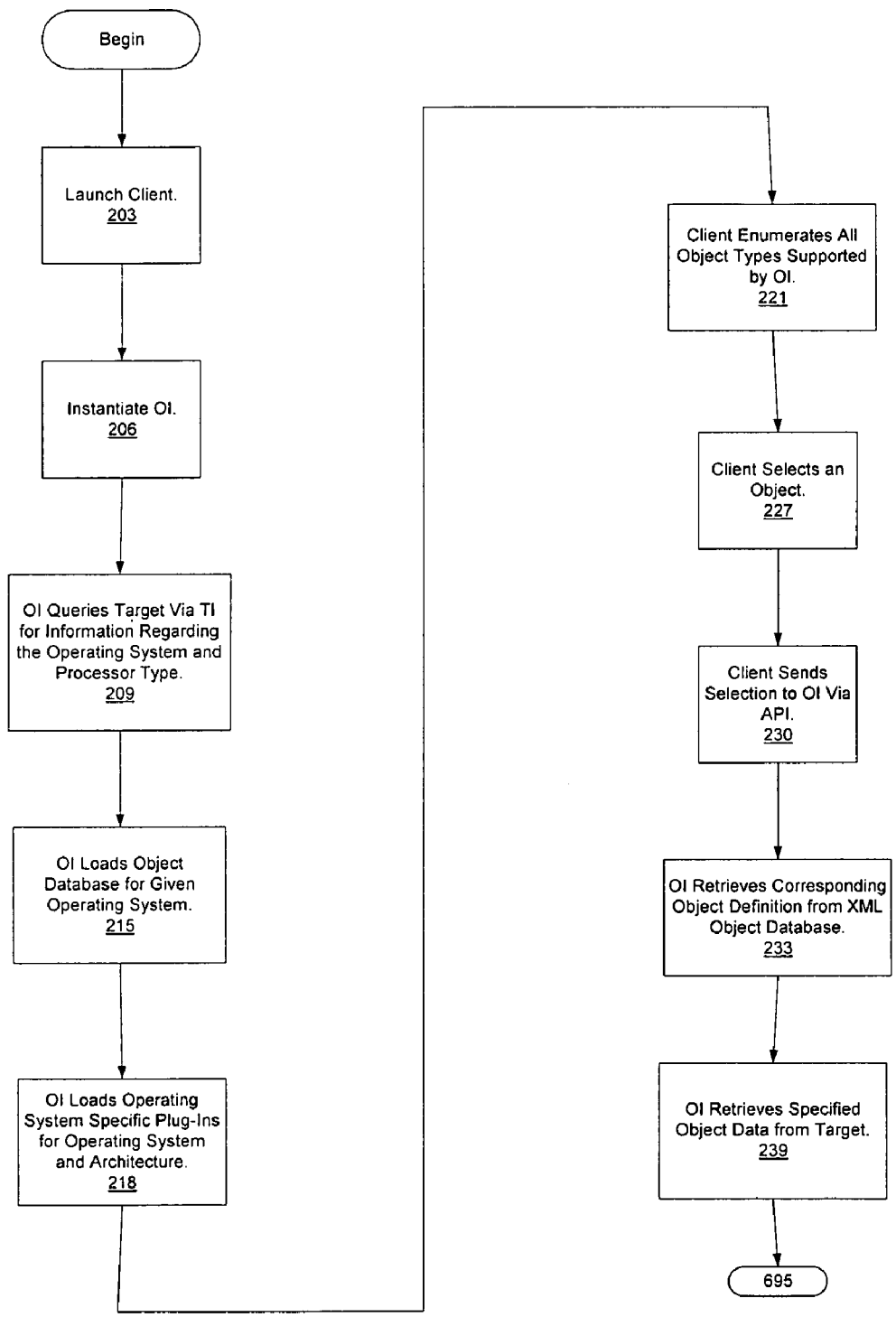
FIGS. 6a–b show a flowchart illustrating the steps involved in gathering object information according to the third exemplary embodiment of the present invention.
Figure 6B:
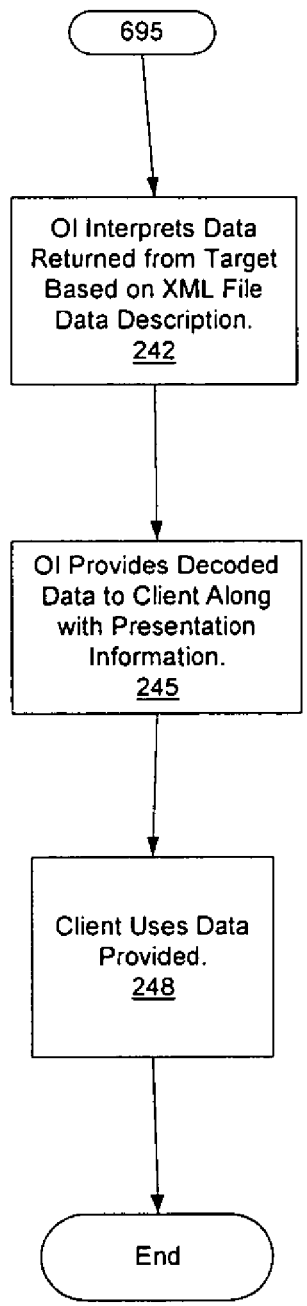

FIGS. 6a–b (hereinafter, collectively referred to as "FIG. 6") show a flowchart illustrating the steps involved in gathering information about the objects running on the target 20 using the third exemplary embodiment of the present invention. In this exemplary embodiment, step 218 is added to the steps described earlier in FIG. 2 for gathering information about an object running on the target 20.

Referring to FIG. 6, in step 218, the OI 115 loads the user-defined XML object descriptions (the plug-ins) from the user-defined XML object database 135 for the specified target operating system. The plug-ins allow the user to add custom objects. The plug-ins also allow the OI 115 to support user defined custom objects. The plug-ins expand the number of objects that are supported by the OI 115. After the plug-ins are loaded in step 218, the OI 115 is now initialized.

In a fourth embodiment of the present invention, data extraction routines are used rather than the Gopher program to retrieve object data from the target 20. FIG. 7 is a block diagram illustrating the development environment 1 according to the fourth embodiment of the present invention.

Included in a data extraction development system 25 is an object description module 155 which contains descriptions of each of the objects running on the target 20. In order for the object descriptions to be architecture-generic, they are implemented using XML. The object description module 155 contains XML code for describing each of the object's public attributes. The object description module 155 also contains data extraction routines; each object description specifies a data extraction routine for that object. Different data extraction routines may exist for each target processor architecture supported by the data extraction development system 25 and the data extraction routines may be pre-compiled using the appropriate compiler.

The data extraction routine is downloaded to the target 20 via the TI 120 in order to assemble data about the selected object on the target 20 in the format described in the XML object description found in the object description module 155. In an alternative embodiment, the data extraction routine already resides on target 120 and therefore does not need to be downloaded. The data extraction routine assembles the data about the selected object on the target 20 into a data packet and places it in a target buffer.

Figure 8:
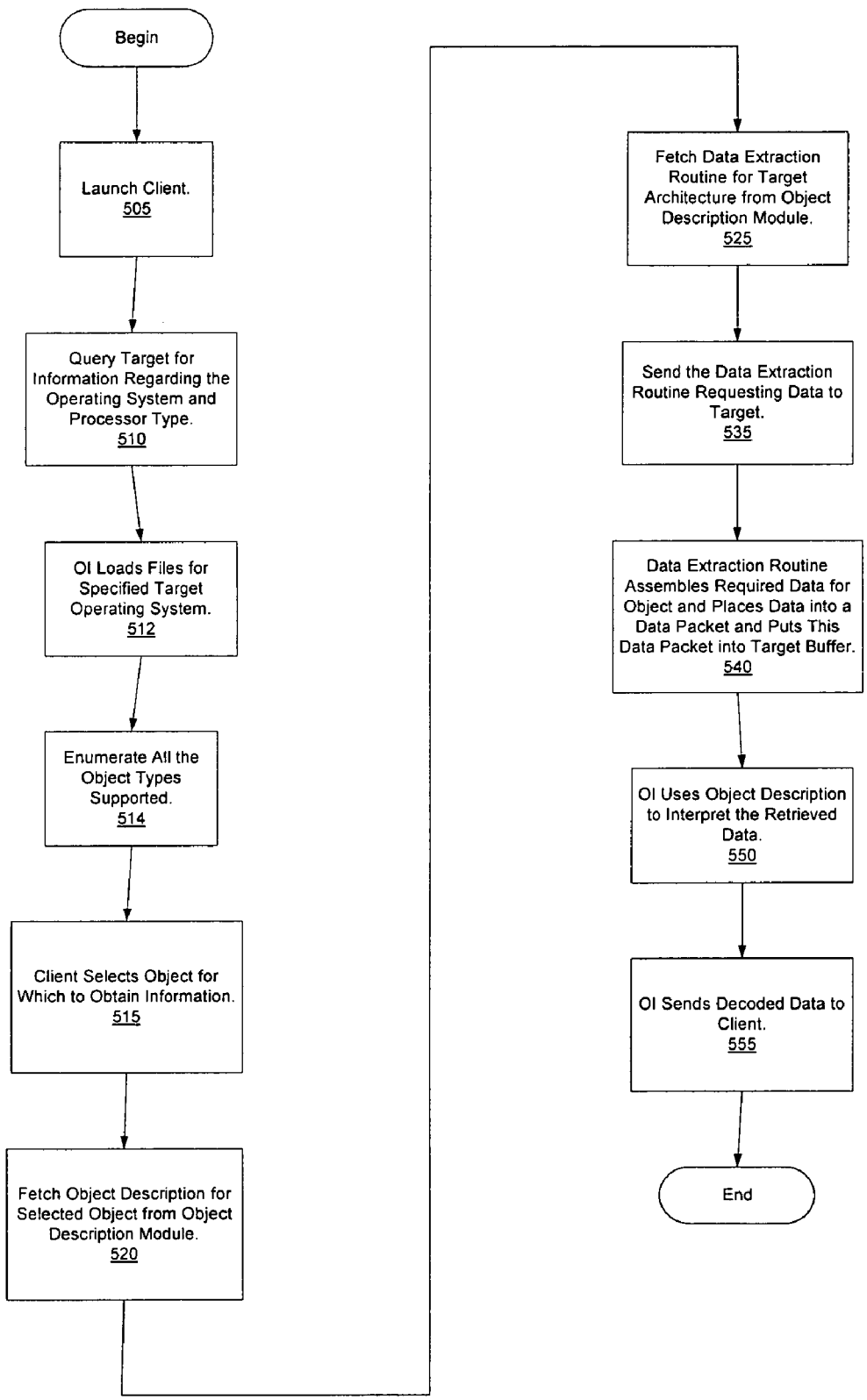
FIG. 8 shows a flowchart illustrating the steps involved in gathering object information according to the fourth embodiment of the present invention.

FIG. 8 is a flowchart illustrating the steps involved in gathering object information in the fourth embodiment of the present invention. In step 505, the client 105 is launched by, for example, a user. In step 510, the OI 115 queries the target 20 via the TI 120 for information regarding the processor type and the operating system 150 of the target 20. In step 512, the OI 115 loads the XML files for the specified target operating system from the object description module 155. In step 514, the client 105 "enumerates" (determines) all the object types supported by the OI 115.

In step 515, the client 105 selects an object for which to obtain information and this selection is sent to the OI 115 via the API 110. In the case of the object browser, the object whose public attributes are to be displayed is selected by a user. In step 520, the object description for the selected object is fetched from the object description module 155. In step 525, the data extraction routine corresponding to the processor architecture of the target 20 is fetched from the object description module 155.

In step 535, the compiled data extraction routine is sent to the target 20 via the TI 120. In step 540, the data extraction routine assembles the requested data for the selected object and places this data into a data packet and puts this data packet into a target buffer. In step 550, the OI 115 uses the object description, found earlier in the object description module 155, in order to interpret the retrieved data. The OI 115 formats the requested data by matching it with the object description found in the object description module 155. In step 555, the OI 115 sends the decoded data to the client 105. In the case that the client 105 is the object browser, the decoded data (the object information) can be displayed to the user.

FIGS. 9a–b (hereinafter, collectively referred to as "FIG. 9") show a sample listing of XML code used to implement a semaphore object according to the fourth embodiment of the present invention. The first line of FIG. 9 is an XML declaration which specifies the version of XML being used (here, version "1.0" is being used). The first line also contains an encoding declaration (here, characters are encoded using UTF-8). The second line specifies the name of the object; in FIG. 9, the object is named "binarySemaphore". A <requestBegin> element defines the routine (i.e., the data extraction routine) needed to request object data to be collected. A <requestEnd> element defines the routine needed to complete the object data request.

A <data> element defines the data assembled for use by the object browser. The <data> element includes the definition of the data items which will be assembled by the target 20 and downloaded to the host 10 in a data packet. The host 10 uses <dataItem> definitions in the <data> element to decode this data packet. For each <dataItem>, information is provided to allow the host 10 to extract the data from the data packet and to know how to display it in the object browser. A "type" attribute specifies the number of bytes in the data item and how it should be interpreted. A "idref" attribute is an internal name for the dataItem. A "text" attribute is the label to be used in the object browser for the dataItem. A "format" attribute is a C-style format stating how the data should be displayed by the client. A "display" attribute indicates whether the dataItem is displayed; if display is set to "always" then the dataItem is always displayed, if display is set to "optional" then the user can elect to display the dataItem, and if display is set to "never" then the dataItem is never displayed.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A method retrieving and presenting data from a target system, comprising:
   receiving target system information from the target system, wherein the target system information includes a processor type of the target system and an operating system type of the target system;
   retrieving a set of object description files corresponding to the target system information, the set of object description files being a set of XML object description files, wherein retrieving the set of object description files corresponding to the target system information includes retrieving the set of XML object description files corresponding to the operating system type of the target system;
   sending to a client a set of objects supported based on the set object description files retrieved;
   receiving a select object from the client;
   selecting one of the set of object description files corresponding to the selected object;
   retrieving one of a set of data retrieval programs corresponding to the target system information, wherein the set of data retrieval programs is a set of Gopher programs;
   retrieving object data about the selected object using the retrieved one of the set of data retrieval programs;
   decoding the object data about the user selected object using the selected one of the set of object description files corresponding to the selected object to form decoded object data; and
   sending the decoded object data and a presentation format to the client allowing the client to be data driven.

2. The method of claim 1 wherein retrieving the set of object description files corresponding to the target system information includes retrieving the set of user-defined XML object description files corresponding to the operating system type of the target system.

3. The method of claim 1 wherein the selected object is received from the client using an application programming interface.

4. The method of claim 2 wherein retrieving one of the set of data retrieval programs corresponding to the target system information includes retrieving one of the set of Gopher programs corresponding to the processor type of the target system.

5. The method of claim 4 wherein retrieving the object data about the selected object includes passing the retrieved one of the set of Gopher through a target interface to retrieve the object data for the selected object from the target system.

6. The method of claim 1 wherein the client is an object browser.

7. The method of claim 1 wherein the set of XML object description files is stored in an XML object database and the set of Gopher programs is stored in the XML object database.

8. The method of claim 1 wherein the set of data retrieval program is a set of data extraction routines.

9. The method of claim 8 wherein accessing the object database to retrieve one of a set of data retrieval programs corresponding to the target system information includes accessing the object description module to retrieve one of the set of data extraction routines corresponding to the processor type of the target system.

10. The method of claim 9 wherein retrieving the object data about the selected object includes passing the retrieved one of the set of data extraction routines through a target interface to retrieve the object data for the selected object from the target system.

11. The method of claim 10 wherein the set of XML object description files is stored in an object description module and the set of data retrieval programs is stored in the object description module.

12. A device comprising:
    a medium; and
    a set of instructions recorded on the medium;
    wherein the set of instructions, when executed by a processor, cause the processor to:
    receive target system information from the target system, wherein the target system information includes a processor type of the target system and an operating system type of the target system;
    retrieve a set of object description files corresponding to the target system information, the set of object description files being a set of XML object description files, wherein retrieving the set of object description files corresponding to the target system information includes retrieving the set of XML object description files corresponding to the operating system type of the target system;
    send a client a set of objects supported based on the set of object description files retrieved;
    receive the selected object from a client;
    select one of the set of object description files corresponding to the selected object;
    retrieve one of a set of data retrieval programs corresponding to the target system
    information, wherein the set of data retrieval programs is a set of Gopher programs;
    retrieve object data about the selected object using the retrieved one of the set of data retrieval programs;
    decode the object data about the user selected object using the selected one of the set of object description files corresponding to the selected object to form decoded object data; and
    send the decoded object data and a presentation format to the client allowing the client to be data driven.

* * * * *